United States Patent
Andrei et al.

(10) Patent No.: US 12,333,040 B2
(45) Date of Patent: Jun. 17, 2025

(54) NATIVE MULTI-TENANCY FOR DATABASE SYSTEM

(71) Applicant: SAP SE, Walldorf (DE)

(72) Inventors: Mihnea Andrei, Issy les Moulineaux (FR); Alexander Boehm, Schwetzingen (DE); Norman May, Karlsruhe (DE); Urs Klingsporn, Walldorf (DE); Meinolf Block, Heidelberg (DE); Patrick Voelker, Mannheim (DE); Hyunjun Kim, Seoul (KR); Thorsten Glebe, Leimen (DE); Jonathan Bregler, Walldorf (DE); Jaeyoung Choi, Seoul (KR); Martin Kittel, Berlin (DE); Yong Sik Kwon, Seoul (KR); Uwe Hahn, Walldorf (DE); Henning Zahn, Walldorf (DE); Melanie Handreck, Walldorf (DE); Holger Mack, Karlsruhe (DE); Eunsang Kim, Seoul (KR); Frank Renkes, Rauenberg (DE); Juchang Lee, Seoul (KR); Martin Schindewolf, Walldorf (DE); Ivan Bowman, Hammonds Plains (CA); Lars Dannecker, Walldorf (DE)

(73) Assignee: SAP SE, Walldorf (DE)

( * ) Notice: Subject to any disclaimer, the term of this patent is extended or adjusted under 35 U.S.C. 154(b) by 354 days.

(21) Appl. No.: 17/892,597

(22) Filed: Aug. 22, 2022

(65) Prior Publication Data

US 2023/0409730 A1  Dec. 21, 2023

Related U.S. Application Data

(60) Provisional application No. 63/352,779, filed on Jun. 16, 2022, provisional application No. 63/352,811, filed on Jun. 16, 2022.

(51) Int. Cl.
G06F 21/62 (2013.01)
G06F 21/60 (2013.01)
H04L 9/14 (2006.01)

(52) U.S. Cl.
CPC ........ G06F 21/6227 (2013.01); G06F 21/602 (2013.01); H04L 9/14 (2013.01)

(58) Field of Classification Search
CPC .... G06F 21/6227; G06F 21/602; G06F 16/27; G06F 21/6218; H04L 9/14
See application file for complete search history.

(56) References Cited

U.S. PATENT DOCUMENTS

| | | | | |
|---|---|---|---|---|
| 2010/0088283 A1* | 4/2010 | Ahmed | ............... | G06F 16/22 707/665 |
| 2013/0103640 A1* | 4/2013 | Rehman | ............. | G06Q 30/0232 707/736 |

(Continued)

FOREIGN PATENT DOCUMENTS

| | | |
|---|---|---|
| WO | 2018/053258 A1 | 3/2018 |
| WO | 2020/162988 A1 | 8/2020 |

OTHER PUBLICATIONS

Communication: "Extended European Search Report", May 17, 2023 (May 17, 2023), European Patent Office, for European Application No. 22204505.6-1203, 9 pages.

(Continued)

*Primary Examiner* — Nicholas R Taylor
*Assistant Examiner* — Tania M Pena-Santana
(74) *Attorney, Agent, or Firm* — Buckley, Maschoff & Talwalkar LLC (57) ABSTRACT

Systems and methods include creation of a first instance of a tenant object in a database instance, association of the first instance of the tenant object with a first plurality of database artifacts including first data associated with the first instance of the tenant object, creation of a second instance of the (Continued)

tenant object in the database instance, association of the second instance of the tenant object with a second plurality of database artifacts including second data associated with the second instance of the tenant object, and reception and response to queries on the first data associated with the first instance of the tenant object and to queries on the second data associated with the second instance of the tenant object.

20 Claims, 7 Drawing Sheets

(56) References Cited

U.S. PATENT DOCUMENTS

| | | | | |
|---|---|---|---|---|
| 2013/0179753 A1* | 7/2013 | Flynn | ................... | H05K 7/1444 |
| | | | | 714/773 |
| 2014/0074539 A1 | 3/2014 | Doering et al. | | |
| 2017/0017470 A1* | 1/2017 | Chenny | ...................... | G06F 8/36 |
| 2017/0323112 A1* | 11/2017 | Tran | ...................... | G06F 16/258 |
| 2019/0173674 A1 | 6/2019 | Agarwal et al. | | |
| 2020/0250325 A1* | 8/2020 | Chong | ................. | G06F 21/6218 |
| 2023/0315584 A1* | 10/2023 | Sagiraju | .................. | G06F 3/065 |
| | | | | 714/6.12 |

OTHER PUBLICATIONS

Schiller, Oliver et al., "Native Support of Multi-tenancy in RDBMS for Software as a Service", Extending Database Technology, ACM, 2 Penn Plaza, Suite 701 New York, NY 10121-0701, USA, Mar. 21, 2011 (Mar. 21, 2021), XP058002015, DOI: 10.1145/1951365. 1951382, ISBN: 978-1-4503-0528-0, (pp. 117-128, 12 total pages).

"First Japanese Office Action", dated Sep. 9, 2024 (Sep. 9, 2024), for Japanese Application No. 2022-175630, 3pgs.

Schiller, Oliver et al., "Native Support of Multi-tenancy in RDBMS for Software as a Service", EDBT 2011, Mar. 22-24, 2021, Uppsala, Sweden, ACM 978-1-4503-0528-0/11/0003, (pp. 117-126, 13 total pages).

"Japanese Official Notice of Allowance", dated Dec. 16, 2024 (Dec. 16, 2024), for Japanese Application No. 2022-175630, 3pgs.

* cited by examiner

NATIVE MULTI-TENANCY FOR DATABASE SYSTEM

CROSS-REFERENCE TO RELATED APPLICATIONS

The present application claims priority to U.S. Provisional Patent Application Nos. 63/352,779 and 63/352,811, filed Jun. 16, 2022, the entire contents of which are incorporated by reference herein for all purposes.

BACKGROUND

Multi-tenancy is a software architecture pattern which facilitates the sharing of computing resources among disparate groups of users. For example, a single multi-tenant application (e.g., a Software-as-a-Service (SaaS) application) may serve multiple end user groups (i.e., customers) within a single software instance. Such a software instance uses a much smaller computing resource footprint than would be required to provision one software instance per customer. Multi-tenancy can therefore provide substantial cost benefits.

The data of each customer in a multi-tenant architecture is typically mapped to a corresponding tenant in the underlying data layer. This mapping allows for logical separation of the data within the data layer and facilitates access thereto by the multi-tenant application. In some multi-tenant architectures, the data of each tenant is managed by a different database instance executing within a same computing system (e.g., a rack server). These architectures provide excellent separation of tenant data but it may be cost-inefficient in some scenarios to require a full database instance per tenant. For example, a smallest database instance may consume 32 Gb of memory, which may represent significantly more computing resources than should be required by a small tenant.

Other multi-tenant data architectures use a single database instance to manage the data of multiple tenants. Since the data in such an architecture is not physically separated, the multi-tenant application is responsible for tracking and managing the data in a tenant-aware manner. For example, a database system may use one schema of a single instance for all tenants, where the data of each tenant is partitioned via a discriminating column. The multi-tenant application uses the values of the discriminating column to identify the data belonging to specific tenants. The database, on the other hand, is unaware of the existence of the multiple tenants and operates in the same manner as if it were being accessed by a single-tenant application.

Database systems advantageously provide encryption, backup/restore, cloning, and moving of the data stored therein. What is needed are database systems which provide such database-instance-level features on a tenant-level.

DETAILED DESCRIPTION

The following description is provided to enable any person in the art to make and use the described embodiments. Various modifications, however, will be readily-apparent to those in the art.

According to some embodiments, a native multi-tenant database system includes a database-level tenant object (e.g., a database catalog object) which facilitates the implementation of multi-tenant architectures on the application layer. A tenant object is a logical collection of data as well as metadata artifacts which have been assigned to a tenant. Tenants may be exposed as first-class database objects (i.e., having an identity independent of any other database entity).

The database artifacts assigned to a particular instantiation of a tenant object (i.e., a particular tenant) may include, but are not limited to, data of one or more schemas, tables, and partitions, as well as metadata defining views on the tenant's tables, virtual tables, caches, remote sources, workload classes used to govern resource usage for the tenant's database objects, and database users. Advantageously, the lifecycle of a tenant may be decoupled from the lifecycle of its assigned database artifacts. However, in some embodiments, dropping of a tenant from a database instance results in dropping of artifacts assigned thereto, so long as those artifacts are not assigned to another tenant of the database instance.

A native multi-tenant database system may include one or more database instances, the data of all tenants, and the engines for processing the data. The single system also includes a single persistence for the data of all the tenants. By allowing multiple, independent tenants, or rather customers, to be hosted on a single instance and share computing resources, deployment of a new tenant to a database instance is associated with a near-zero marginal cost. The latter comes at a cost of lower isolation between the different tenants. Moreover, embodiments enable a pay-per-use model by having a finer granularity than that required for provisioning a separate database instance.

In a case that a tenant requires stronger data isolation than the logical isolation described above, the tenant may be deployed as the sole tenant of a database instance. Since such an arrangement would not fully partake of the cost benefits of multi-tenancy, the price charged to the sole tenant may be higher than otherwise.

A database system according to some embodiments supports requests for tenant-level database operations which would otherwise need to be implemented by the application. These operations may include tenant creation, tenant drop, tenant move, tenant restore from backup, tenant clone, tenant resize and tenant resource limitation. In some embodiments, a shared service exposes APIs (e.g., via REST) which are called by muti-tenant applications to request these tenant-level operations from the database system using, for example, an associated tenant id. Current database system DDLs may be extended to support the assignment of database artefacts to tenants.

A tenant-level clone operation may be useful to onboard a new customer in order to provide template data to the new customer. The clone operation is a form of tenant creation.

Some embodiments provide tenant-level recovery of point-in-time data. This recovery does not recover the data of all customers (i.e., the data of the entire database instance) but rather the data of a specific tenant. For example, if one tenant's data becomes corrupted, only the data of the corrupted tenant needs to be recovered.

According to some embodiments, one user can only define the artifacts assigned to the tenant and another user is only allowed to perform clone/move operations. Otherwise, a malicious administrator could create a tenant, assign objects to the tenant, and clone the tenant's content to another system that is fully controlled by the malicious administrator. Additionally, a malicious administrator could drop a tenant and delete all objects assigned to that tenant.

Embodiments may provide tenant-level encryption to encrypt data of the tables that are assigned to a tenant. This functionality encrypts each tenant's persisted data (i.e., data-at-rest) with a separate tenant-specific key, despite the fact that this data is not physically segregated from other tenants' data within the database instance. Embodiments may therefore enable database instance access to customer-specific key repositories.

Shared data and metadata (e.g., database catalog, users, shared containers) may be encrypted in the persistence layer using a database instance-specific key. In contrast, prior systems offered encryption of the entire persistence layer using a single database instance-specific key.

The location of a tenant, i.e., the database instance in which it and its artifacts resides, is one of the properties of a tenant and is determined by the multi-tenant application. The application may also determine to move a tenant from one database instance to a different database instance as it grows or shrinks in data size and resource consumption. This move operation provides elasticity in cloud-based implementations and is preferably performed online to avoid downtime. Tenant-specific security properties such as encryption should be preserved during a tenant move operation.

Database resource consumption quotas may be defined at the tenant-level. These quotas may address "noisy neighbor" issues. A tenant session variable may define tenant-specific usage limits for memory, threads, network I/O, disk I/O, disk size, etc., depending on the ability of the technical infrastructure to measure and control such usage.

Figure 1:
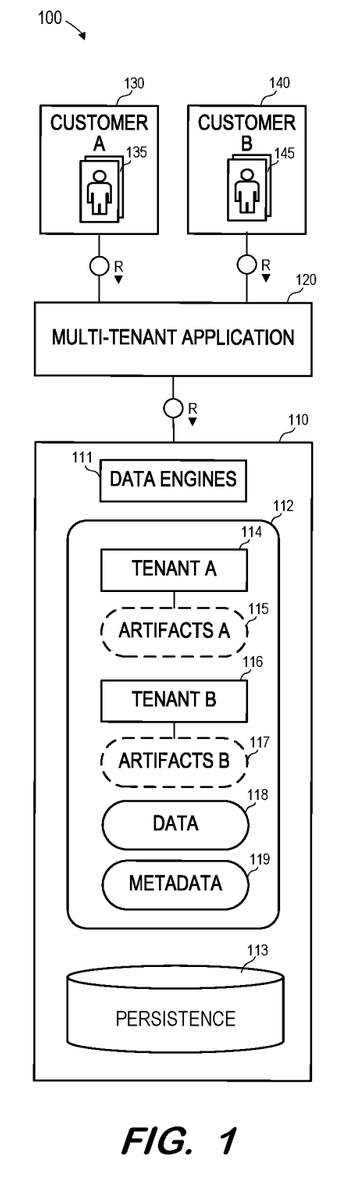
FIG. 1 is a block diagram of a database system providing native multi-tenancy according to some embodiments.

FIG. 1 is a block diagram of system 100 according to some embodiments. The illustrated elements of system 100 and of all other architectures depicted herein may be implemented using any suitable combination of computing hardware and/or processor-executable program code that is or becomes known. Such combinations may include one or more programmable processors (microprocessors, central processing units, microprocessor cores, execution threads), one or more non-transitory electronic storage media, and processor-executable program code. In some embodiments, two or more elements of system 100 are implemented by a single computing device, and/or two or more elements of system 100 are co-located. One or more elements of system 100 may be implemented as a cloud service (e.g., Software-as-a-Service, Platform-as-a-Service) using cloud-based resources, and/or other systems which apportion computing resources elastically according to demand, need, price, and/ or any other metric.

Database instance 110 provides native multi-tenancy according to some embodiments. Database instance 110 may be provisioned on any suitable combination of hardware and software, including one or more computer servers or virtual machines. In some embodiments, database instance 110 comprises a containerized application executing within a software container. Such containers may be implemented by one or more nodes of a cluster (e.g., a Kubernetes cluster) as is known in the art.

Database instance 110 includes data engines 111 for processing data and metadata stored in volatile (e.g., Random Access) memory 112. Memory 112 includes data 118 and metadata 119 of all tenants assigned to database instance 110. Each tenant of system 100 will be described as corresponding to a customer, where a customer may be a company, a division, a workgroup, or any other group of users. A tenant may correspond to a particular cloud resource/ service subscription of a given customer. In this regard, a customer may be associated with more than one subscription and therefore more than one tenant.

In particular, memory 112 includes tenant instance 114 of tenant 'A' and tenant instance 116 of tenant 'B'. Each tenant instance 114 and 116 is an instance of a tenant object defined in metadata 119. Tenant instances 114 and 116 may be stored within data 118 but are depicted separate therefrom for ease of understanding.

As described above, each tenant instance 114 and 116 is a collection of database artifacts. The artifacts assigned to each tenant instance 114 and 116 are stored among data 118 and metadata 119. Accordingly, artifacts A 115 assigned to tenant instance 114 and artifacts B 117 assigned to tenant instance 116 are depicted using dashed lines to represent references to database artifacts of data 118 and metadata 119. The database artifacts assigned to a tenant instance may include, for example, one or more schemas, tables, and partitions. The database artifacts may also include metadata defining views on the tenant's tables, virtual tables, caches, remote sources, workload classes used to govern resource usage for the tenant's database objects, and database users.

Database instance 110 also includes persistence 113 for persisting data 118 and metadata 119 of all assigned tenants (as well as separately-depicted instances 114 and 116). Persistence 113 may be implemented using any persistent data storage system that is or becomes known, including but not limited to distributed data storage systems. Persistence 113 may persist transaction logs and other database artifacts as is known in the art.

Database instance 110 thereby provides a single data server including the data and metadata of all tenants of the database instance, the engines for processing the data, and a single persistence for the data and metadata. Hosting multiple independent tenants on such a single database instance facilitates sharing of computing resources at near-zero marginal cost.

Multi-tenant application 120 may comprise a SaaS application but embodiments are not limited thereto. Multi-tenant application 120 may be provisioned on one or more computer servers or virtual machines and may comprise a containerized application executing within a software container. Multi-tenant application 120 issues queries (e.g., SQL, MDX) to database instance 110 based on input received from users 135 and 145 of customers 130 and 140, respectively.

It will be assumed that customer A 130 corresponds to tenant A 114 of database instance 110 and that customer B 140 corresponds to tenant B 116 of database instance 110. Upon receipt of input from a user 135 of customer A 130, multi-tenant application 120 may transmit a query to database instance 110 which indicates an association with tenant A 114. Similarly, upon receipt of input from a user 145 of customer B 140, multi-tenant application 120 may transmit a query to database instance 110 along with an indication that the query is associated with tenant B 116. Upon receipt of a query from multi-tenant application 120, database instance 110 processes the query using data engines 111 and the artifacts assigned to the tenant with which the query is associated.

Accordingly, multi-tenant application 120 is able to determine the tenant which corresponds to a user from whom input is received. For example, each user may logon to multi-tenant application 120 using a tenant-specific subscription. Multi-tenant application 120 therefore associates a user with the tenant of the subscription under which the user has logged on. In another example, communications between users and multi-tenant application 120 may include tenant-identifying tokens.

Multi-tenant application 120 is also aware of which tenants are placed on which database instances. In this regard, multi-tenant application 120 may request provisioning of database instances and creation of tenants on provisioned database instances. Upon receiving input from a user associated with a given tenant, multi-tenant application 120 is able to determine the database instance which includes the given tenant and to which a corresponding query should therefore be directed.

Multi-tenant application 120 may request provisioning of database instances and creation of tenants on provisioned database instances based on input received by a customer key user. According to some embodiments, multi-tenant application 120 calls a provisioning service (not shown in FIG. 1) to provision a new database instance. Multi-tenant application 120 may also call REST APIs of a tenant lifecycle management service (not shown in FIG. 1), to create a tenant on a database instance, drop a tenant from a database instance, move a tenant to a database instance, recover a tenant from a database backup, clone a tenant to a database instance (i.e., create as a template), resize a tenant on a database instance, define tenant resource limits on a database instance, etc.

Figure 2:
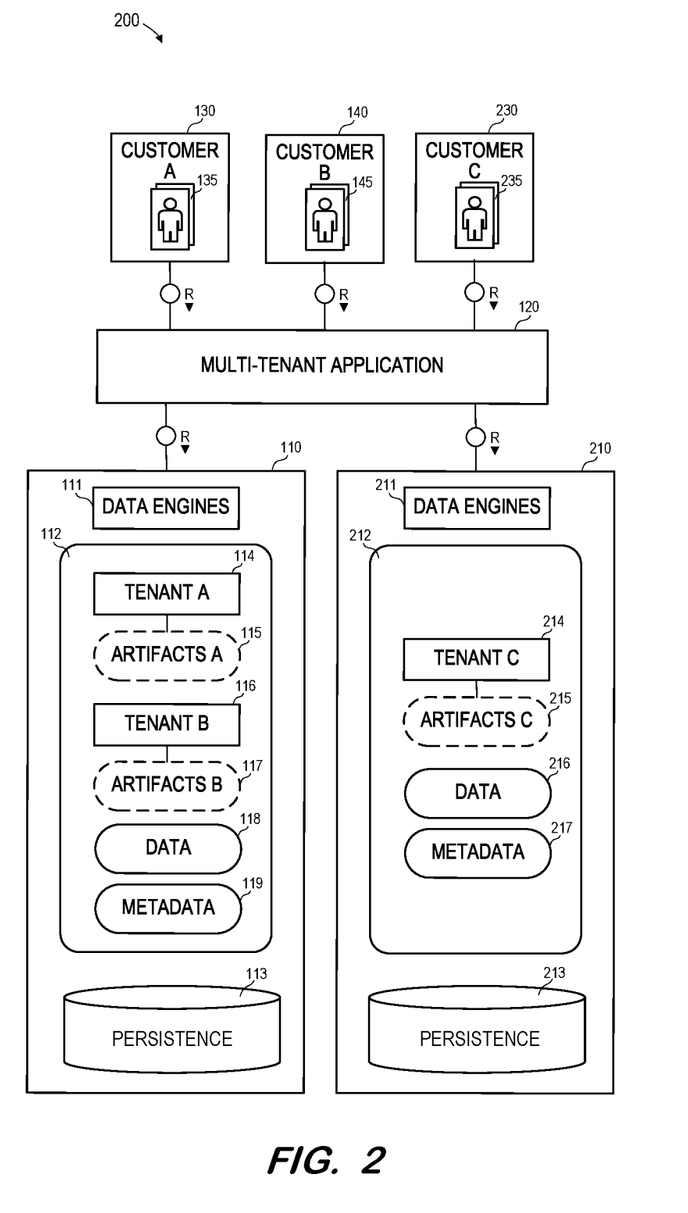
FIG. 2 is a block diagram of a database system providing native multi-tenancy according to some embodiments.

FIG. 2 illustrates system 200 in which multi-tenant application 120 has requested provisioning of database instance 210 in addition to database instance 110. Database instance 210 includes its own data engines 211, memory 212 and persistence 213.

Multi-tenant application 120 has also requested creation of tenant C on database instance 210. Tenant C corresponds to customer C 230. Accordingly, memory 212 includes tenant object instance 214 of tenant C assigned to artifacts C 215. Artifacts C 215 comprise data and metadata stored in data 216 and metadata 217 of memory 212. Accordingly, upon receiving input from a user 235 of customer C 230, multi-tenant application 120 directs any resulting queries to database instance 210 because multi-tenant application 120 is aware that database instance 210 includes tenant C 214 corresponding to customer C 230.

According to some embodiments, each tenant is identified by a name that is unique within its own database instance. Therefore, tenant C 214 may be named tenant A because database instances 110 and 210 operate independently. A multi-tenant application may provision multiple database instances and provide elasticity to its tenants through tenant move operations. In such a case, the application should ensure that the movement of a tenant to a target database instance does not introduce tenant name conflicts on the target database instance.

Figure 3:
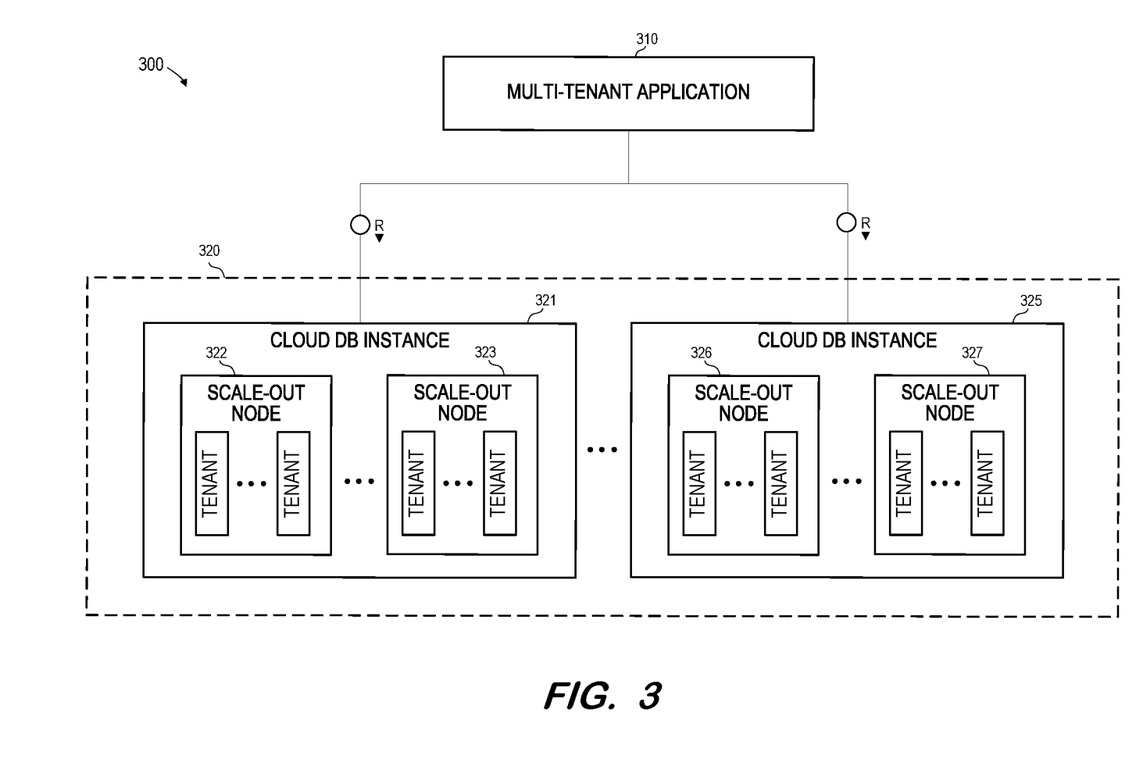
FIG. 3 is a block diagram of a cloud-based database architecture providing native multi-tenancy according to some embodiments.

FIG. 3 illustrates system 300 in which multi-tenant application 310 is associated with instance farm 320. Farm 320 includes several database instances including instances 321 and 325. Farm 320 may comprise execution environments on which multi-tenant application 310 may provision database instances and create tenants thereon.

Multi-tenant application 310 is aware of the database instances provisioned within farm 320 and of the tenants which are on each database instance. Each database instance of farm 320 is aware of its tenants and of the users, schemas and other metadata it stores. However, a given database instance of farm 320 is unaware of the tenants, schemas, etc. of other database instances of farm 320.

Multi-tenant application 310 may specify a memory size and a persistence size for each database instance of farm 320, and grow or shrink these sizes as desired. Multi-tenant application 310 may also create a tenant on a database instance f farm 320, specify an initial size thereof, and grow or shrink the tenant size as desired. As described above, multi-tenant application 310 may also drop a tenant from or move a tenant to a database instance.

Each database instance of system 300 may be executed by a cluster (e.g., a Kubernetes cluster). Each cluster may allow multi-tenant application 310 to provision scale-out nodes to provide additional computing resources to its database instance. Moreover, multi-tenant application 310 may be node-aware, allowing the movement of tenants between nodes of a same database instance or nodes of different database instances.

Figure 4:
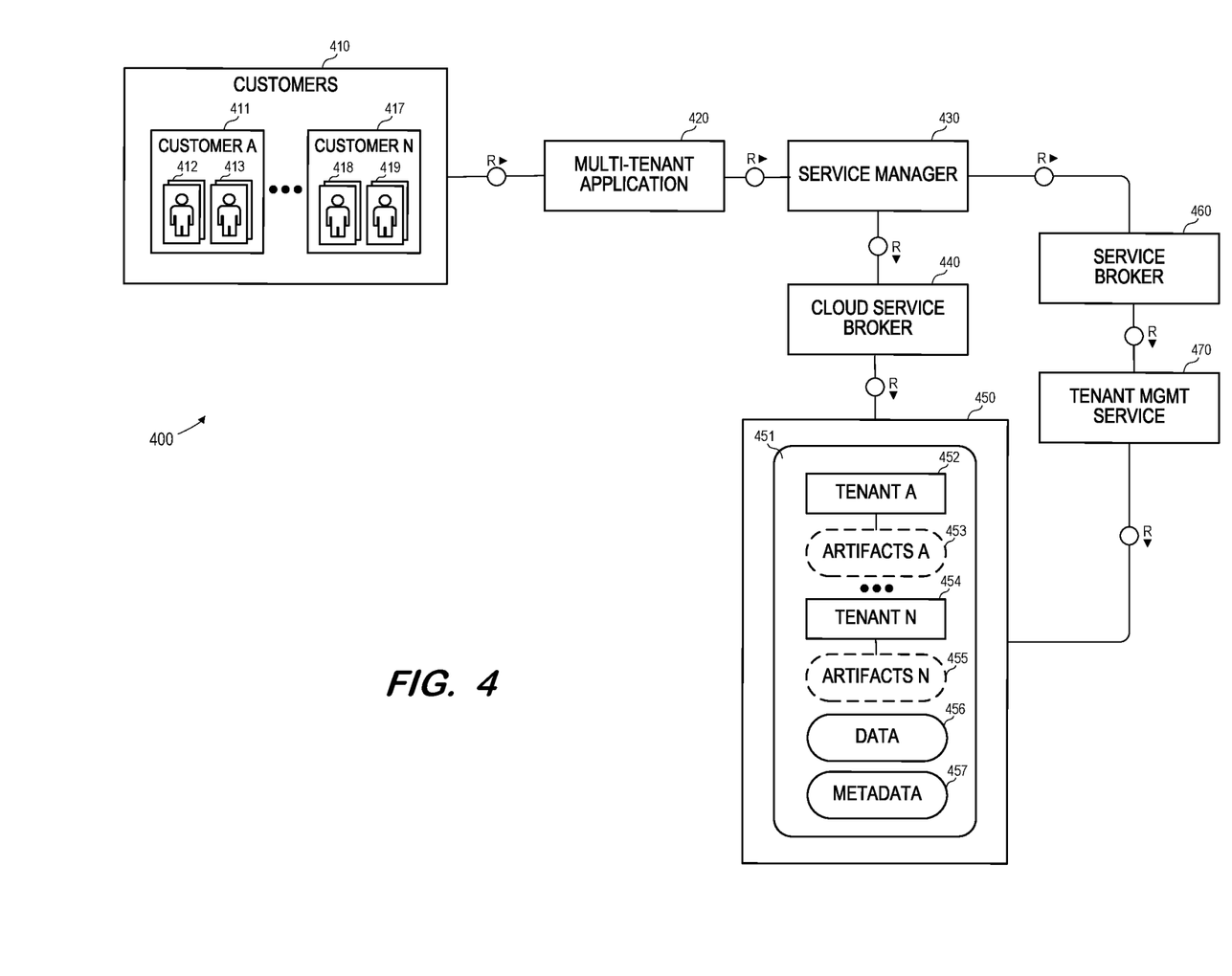
FIG. 4 is a block diagram of a database system providing native multi-tenancy according to some embodiments.

FIG. 4 is a block diagram of system 400 providing native multi-tenancy according to some embodiments. Database instance 450 includes tenant object instances 452 and 454 associated with artifacts 453 and 455 as described above. The data engines and persistence of database instance 450 have been omitted from FIG. 4 for clarity.

Figure 5:
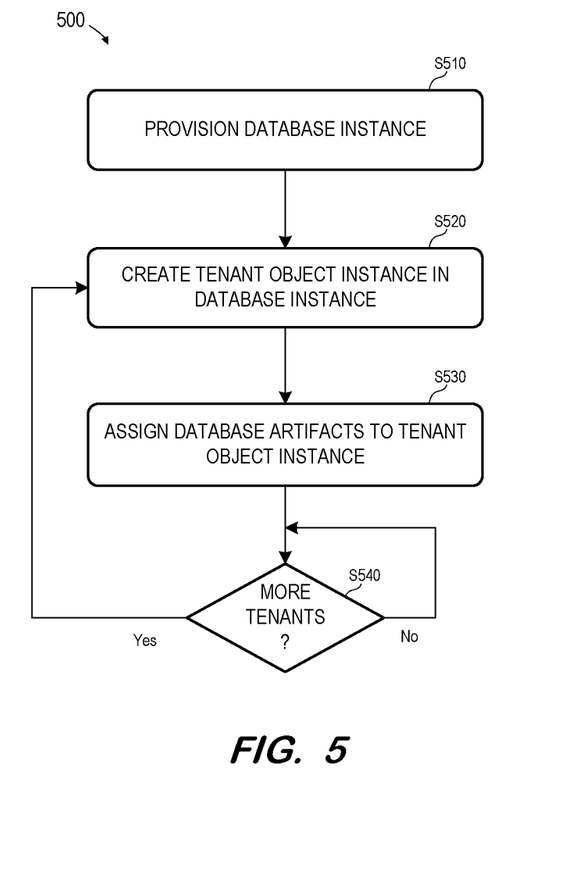
FIG. 5 is a flow diagram of a process to create tenants in a cloud database instance according to some embodiments.

Each tenant instance of database instance 450 corresponds to a respective one of customers 410. Customer A 411 includes key users 412 and business users 413, and customer N 417 includes key users 418 and business users 419. FIG. 5 comprises a flow diagram of process 500 to provision a database instance and create tenant instances therein as shown in FIG. 4 and according to some embodiments.

Process 500 and all other processes mentioned herein may be embodied in program code executable by one or more processing units (e.g., processor, processor core, processor thread) and read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

The database instance in which the tenants are to reside is initially provisioned at S510. Referring to the FIG. 4 example, a key user 412 may access multi-tenant application 420 to request provisioning of a database instance. This request is forwarded to service manager 430 and to cloud service broker 440. Cloud service broker 440 then provisions database instance 450 as a cloud-based resource at S520.

A tenant object instance is created in the database instance at S520. Continuing the above example, a key user 412 may access multi-tenant application 420 to request creation of a tenant on database instance 450. This request is forwarded to service manager 430, to service broker 460, and to tenant management service 470. Tenant management service 470 then instructs database instance 450 to create tenant A instance 452 based on a tenant object defined in metadata 457. Tenant A instance 452 may be identified by a tenant id which is known to database instance 450 and multi-tenant application 420.

Next, at S530, database artifacts are assigned to the tenant instance created at S520. For example, multi-tenant application 420 requests tenant management service 470 to instruct database instance 450 to associate tenant A instance 452 with artifacts A 453. The key user 412 may have previously operated multi-tenant application 420 and service broker 460 to define artifacts A 453 within data 456 and metadata 457 of database instance 450. Although created by service broker 460, all database artifacts are managed by multi-tenant application 420.

Some embodiments may use a deployment infrastructure to define database artifacts to assign to a tenant instance. The deployment infrastructure may provide a declarative approach for defining database objects (e.g., as design-time artifacts) using containers. For example, service broker 460 may create a container which corresponds to a database schema and additional metadata (e.g., user, roles, privileges which may then be assigned to a tenant instance. Such containers may be isolated from each other by schema-level access privileges. Application 420 can access any database object in the database schema of the container by using an assigned per-schema technical database user.

Flow cycles at S540 until a command is received to create another tenant in the database instance. For example, a key user 418 of customer N 417 may access multi-tenant application 420 to request creation of a tenant on database instance 450. This request is forwarded to service manager 430, to service broker 460, and to tenant management service 470, which instructs database instance 450 at S520 to create tenant N instance 454. At S530, multi-tenant application 420 further instructs tenant management service 470 to assign previously-defined artifacts N 455 to tenant N instance 454.

After provisioning database instance 450 and creating tenants 452 and 454, multi-tenant application 420 may, for example, receive input from a business user 413 of customer A 411. In response, application 420 directs any resulting queries to database instance 450 via tenant management service 470 and identifies tenant A 452. Database instance 450 responds to the queries based on artifacts A 453 of tenant instance A 452. In a case that multi-tenant application 420 receives input from a business user 419 of customer N 417, any resulting queries are directed to database instance 450 and responded to based on artifacts N 455 of tenant instance N 454.

Figure 6:
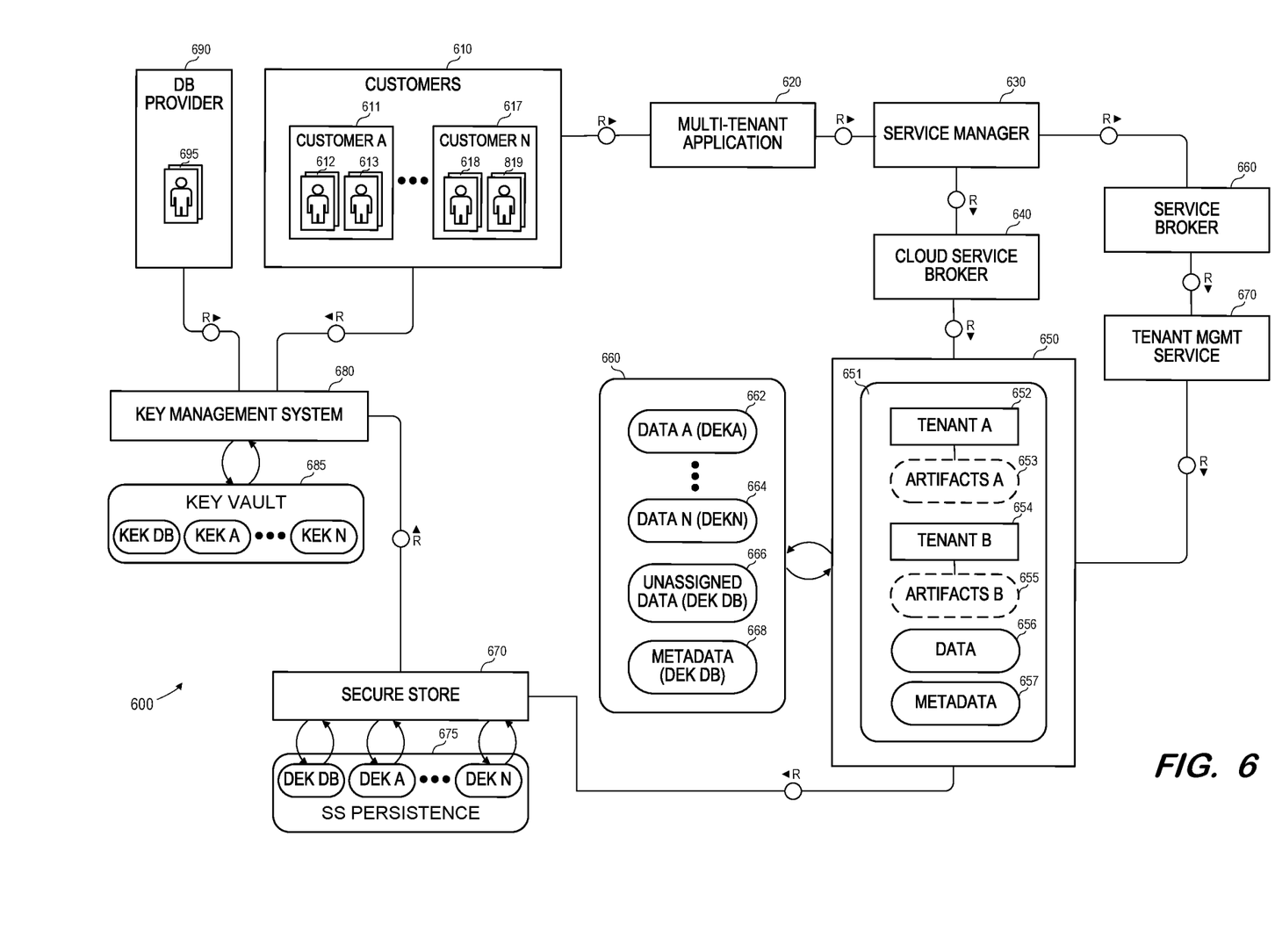
FIG. 6 is a block diagram of a database system providing native multi-tenancy and tenant-level encryption according to some embodiments.

FIG. 6 is a block diagram of system 600 providing native multi-tenancy and tenant-level encryption according to some embodiments. The elements of system 600 which are similarly-numbered to elements of system 400 (i.e., 6xx vs. 4xx) may be implemented and operate similarly.

System 600 shows persistence 660 of database instance 650, which was omitted from FIG. 4. Persistence 660 may be implemented using any suitable storage system or systems. Persistence 660 stores the data 662, 664 of each tenant of instance 650, data 666 of instance 650 which is not assigned to a particular tenant, and metadata 668 of instance 650. Advantageously, and in contrast to prior systems, persisted data 662 and 664 are encrypted using encryption keys (i.e., data encryption key (DEK) A and DEK N) which are specific to their corresponding tenant (i.e., customer). Moreover, persisted unassigned data 666 and metadata 668 are encrypted using a database instance-specific encryption key (i.e., DEK DB).

According to some embodiments, DEK DB is a public-private key pair generated as part of creation of database instance 650. Database instance 650 uses the public key of DEK DB to encrypt data 665 and data 668 prior to storage in persistence 660. Database instance 650 uses the private key of DEK DB is to decrypt data 665 and data 668 as needed. In some embodiments, the private key of DEK DB is stored in secure store persistence 675 in encrypted form.

For example, a key user 695 of database instance provider 690 provides key encryption key (KEK) DB to key management system 680 for storage in key vault 685. KEK DB is used to encrypt the private key of DEK DB prior to storage thereof in secure store persistence 675. KEK DB may also comprise a private-public key pair, in which key vault 685 stores the private key of KEK DB while the corresponding public key is used to encrypt the private key of DEK DB prior to storage thereof in secure store persistence 675.

Accordingly, database instance 650 requests the private key of DEK DB from secure store 670 when database instance 650 wishes to decrypt data 665 or data 668. In response, secure store 670 requests key management system 680 to decrypt the stored encrypted private key of DEK DB using the private key of KEK DB. Database system 650 then uses the decrypted private key of DEK DB to decrypt the desired data of data 665 or data 668.

Similarly, DEK A may comprise a public-private key pair generated during creation of tenant A 652. Database instance 650 uses the public key of DEK A to encrypt data 662 prior to storage in persistence 660. Database instance 650 uses the private key of DEK A is to decrypt data 662 as needed. In some embodiments, the private key of DEK A is stored in secure store persistence 675 in encrypted form.

A key user 612 of customer A 611 provides KEK A to key management system 680 for storage in key vault 685. KEK A is used to encrypt the private key of DEK A prior to storage thereof in secure store persistence 675. KEK A may comprise a private-public key pair, in which key vault 685 stores the private key of KEK A while the corresponding public key is used to encrypt the private key of DEK A prior to storage thereof in secure store persistence 675.

Database instance 650 requests the private key of DEK A from secure store 670 when database instance 650 wishes to decrypt data 662. In response, secure store 670 requests key management system 680 to decrypt the stored encrypted private key of DEK A using the private key of KEK A. The request may be issued to an account of key management system 680 which is specific to customer A 611. Database instance 650 then uses the decrypted private key of DEK A to decrypt the desired data of data 662. Accordingly, if customer A revokes KEK A from key vault 685, database provider 690 cannot decrypt stored private key DEK A and, consequently, cannot decrypt data 662. The foregoing process may occur in the case of each newly-created tenant N.

Architecture 600 may provide other encryption not described herein. For example, data transmitted to and from database instance 650 from a client may be encrypted in transit using TLS/SSL. Moreover, individual table columns in non-persistent memory 651 may be encrypted using known techniques (e.g., using client-controlled keys).

Figure 7:
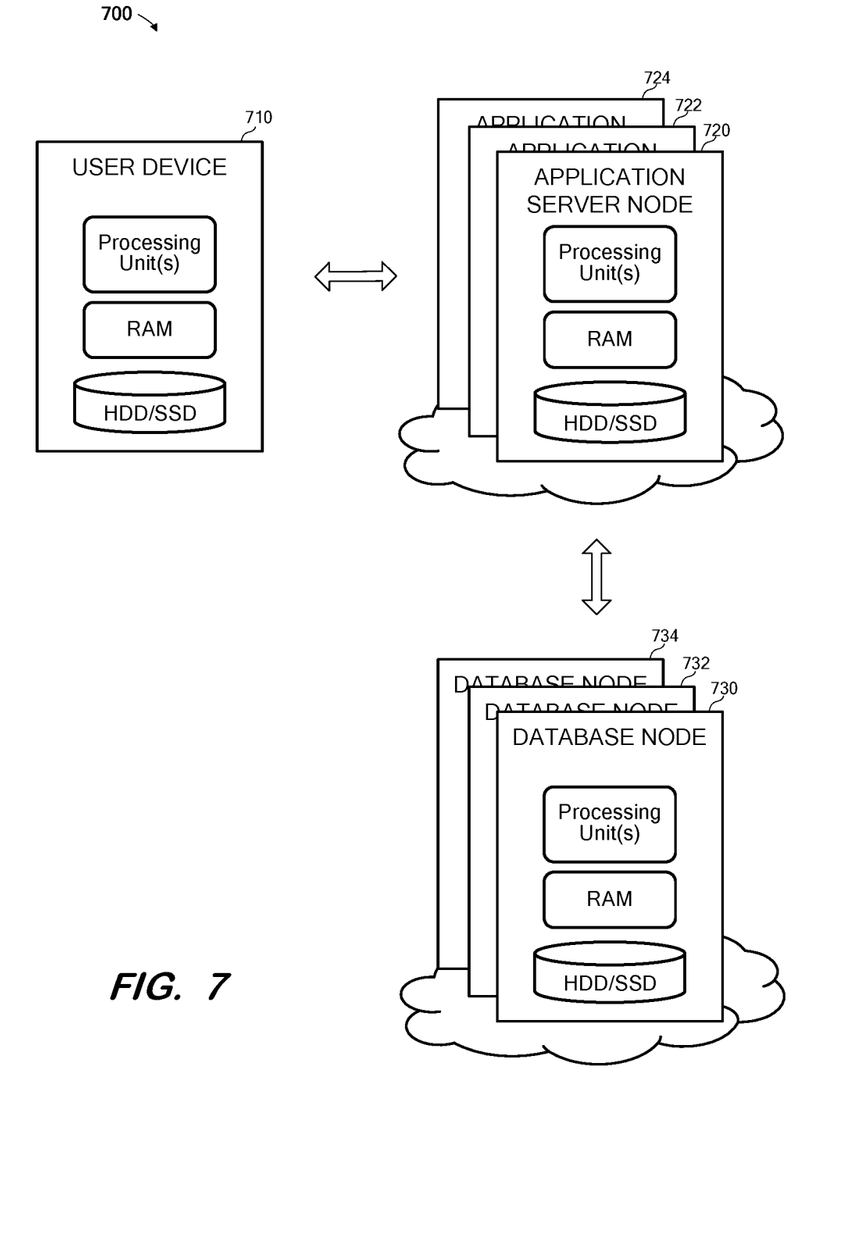
FIG. 7 is a block diagram of a cloud-based system according to some embodiments.

FIG. 7 illustrates cloud-based database deployment 700 according to some embodiments. User device 710 may comprise any suitable computing system operable by a key user or a business user to access a cloud-based multi-tenant application. User device 710 may store and execute program code of a Web browser to access a Uniform Resource Locator (URL) associated with a login page of such a multi-tenant application. The Web browser may download and execute program code of a client-side component of a multi-tenant application as is known in the art.

Application server nodes 720, 722 and 724 may host a multi-tenant application according to some embodiments. Database nodes 730, 732 and 734 may host one or more database instances accessible to the multi-tenant application and providing native multi-tenancy as described herein. Each node of deployment 700 may comprise a separate physical machine or a virtual machine. Such virtual machines may be allocated by a cloud provider providing self-service and immediate provisioning, autoscaling, security, compliance and identity management features.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device may include a programmable processor to execute program code such that the computing device operates as described herein.

All systems and processes discussed herein may be embodied in program code stored on one or more non-transitory computer-readable media. Such media may include, for example, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A database system comprising:
   a memory storing:
      metadata defining a tenant object and a plurality of database artifacts;
      a first instance of the tenant object, the first instance associated with a first plurality of the database artifacts of the database instance including first database tables, first database views on the first database tables and a first schema associated with the first instance of the tenant object; and
      a second instance of the tenant object, the second instance associated with a second plurality of the database artifacts of the database instance including second database tables, second database views on the second database tables, and a second schema to which the second database tables conform, the second database tables, second database views and second schema being different from the first database tables, first database views and first schema; and
   a processing unit to execute program code of a database instance, the program code executable to cause the system to receive and respond to queries on the first database views associated with the first instance of the tenant object and to queries on the second database views associated with the second instance of the tenant object,
   wherein the first instance of the tenant object is not associated with the second plurality of the database artifacts and the second instance of the tenant object is not associated with the first plurality of the database artifacts.

2. A system according to claim 1, the system comprising a persistent storage system storing first persisted data associated with the first instance of the tenant object and second persisted data associated with the second instance of the tenant object.

3. A system according to claim 2, wherein the first persisted data is encrypted using a first encryption key associated with the first instance of the tenant object, and wherein the second persisted data is encrypted using a second encryption key associated with the second instance of the tenant object.

4. A system according to claim 3, the persistent storage system storing third persisted data not associated with the first instance of the tenant object or the second instance of the tenant object, the third persisted data encrypted using a third encryption key and the metadata encrypted using the third encryption key.

5. A system according to claim 1, the program code executable to cause the system to receive and respond to a request to move the first instance of the tenant object and the first plurality of the database artifacts to a second database instance, wherein the second instance of the tenant object and the second plurality of the database artifacts are not moved to the second database instance.

6. A system according to claim 1, the program code executable to cause the system to receive and respond to a request to restore the first instance of the tenant object and the first plurality of the database artifacts from a backup, wherein the second instance of the tenant object and the second plurality of the database artifacts are not restored from the backup.

7. A system according to claim 1, the program code executable to cause the system to receive and respond to a request to associate first resource consumption limits with the first instance of the tenant object and to associate second resource consumption limits with the second instance of the tenant object, wherein the first resource consumption limits are different from the second resource consumption limits.

8. A method comprising:
   creating a first instance of a tenant object in a database instance;
   associating the first instance of the tenant object with a first plurality of database artifacts, the first plurality of database artifacts of the database instance including first database tables, first database views on the first database tables, and a first schema to which the first database tables conform;
creating a second instance of the tenant object in the database instance;
associating the second instance of the tenant object with a second plurality of database artifacts, the second plurality of database artifacts of the database instance including second database tables, second database views on the second database tables, and a second schema to which the second database tables conform, the second database tables, second database views and second schema being different from the first database tables, first database views and first schema; and
receiving and responding to queries on the first database views associated with the first instance of the tenant object and to queries on the second database views associated with the second instance of the tenant object,
wherein the first instance of the tenant object is not associated with the second plurality of the database artifacts and the second instance of the tenant object is not associated with the first plurality of the database artifacts.

9. A method according to claim 8, further comprising storing first persisted data associated with the first instance of the tenant object and second persisted data associated with the second instance of the tenant object in a persistent storage system.

10. A method according to claim 9, wherein the first persisted data is encrypted using a first encryption key associated with the first instance of the tenant object, and wherein the second persisted data is encrypted using a second encryption key associated with the second instance of the tenant object.

11. A method according to claim 10, further comprising encrypting third persisted data not associated with the first instance of the tenant object or the second instance of the tenant object, and metadata defining the first plurality of database artifacts and the second plurality of database artifacts using a third encryption key, and storing the encrypted third persisted data and metadata in the persistent storage system.

12. A method according to claim 8, further comprising:
receiving a request to move the first instance of the tenant object and the first plurality of the database artifacts to a second database instance; and
in response to the request, moving the first instance of the tenant object and the first plurality of the database artifacts to the second database instance, wherein the second instance of the tenant object and the second plurality of the database artifacts are not moved to the second database instance.

13. A method according to claim 8, further comprising:
receiving a request to restore the first instance of the tenant object and the first plurality of the database artifacts from a backup; and
in response to the request, restoring the first instance of the tenant object and the first plurality of the database artifacts from the backup, wherein the second instance of the tenant object and the second plurality of the database artifacts are not restored from the backup.

14. A method according to claim 8, further comprising:
receiving a request to associate first resource consumption limits with the first instance of the tenant object and to associate second resource consumption limits with the second instance of the tenant object; and in response to the request, associating first resource consumption limits with the first instance of the tenant object and second resource consumption limits with the second instance of the tenant, wherein the first resource consumption limits are different from the second resource consumption limits.

15. A non-transitory computer-readable medium storing program code executable by one or more processing units to cause a computing system to:
create a first instance of a tenant object in a database instance;
associate the first instance of the tenant object with a first plurality of database artifacts of the database instance including first database tables, first database views on the first database tables, and a first schema to which the first database tables conform;
create a second instance of the tenant object in the database instance;
associate the second instance of the tenant object with a second plurality of database artifacts of the database instance including second database tables, second database views on the second database tables, and a second schema to which the second database tables conform, the second database tables, second database views and second schema being different from the first database tables, first database views and first schema; and
receive and respond to queries on the first database views associated with the first instance of the tenant object and to queries on the second database views associated with the second instance of the tenant object,
wherein the first instance of the tenant object is not associated with the second plurality of the database artifacts and the second instance of the tenant object is not associated with the first plurality of the database artifacts.

16. A medium according to claim 15, the program code further executable by one or more processing units to cause the computing system to:
store first persisted data associated with the first instance of the tenant object and second persisted data associated with the second instance of the tenant object in a persistent storage system,
wherein the first persisted data is encrypted using a first encryption key associated with the first instance of the tenant object, and
wherein the second persisted data is encrypted using a second encryption key associated with the second instance of the tenant object.

17. A medium according to claim 16, the program code further executable by one or more processing units to cause the computing system to:
encrypt third persisted data not associated with the first instance of the tenant object or the second instance of the tenant object, and metadata defining the first plurality of database artifacts and the second plurality of database artifacts using a third encryption key; and
store the encrypted third persisted data and metadata in the persistent storage system.

18. A medium according to claim 15, the program code further executable by one or more processing units to cause the computing system to:
receive a request to move the first instance of the tenant object and the first plurality of the database artifacts to a second database instance; and
in response to the request, move the first instance of the tenant object and the first plurality of the database artifacts to the second database instance, wherein the second instance of the tenant object and the second plurality of the database artifacts are not moved to the second database instance.

19. A medium according to claim 15, the program code further executable by one or more processing units to cause the computing system to:
receive a request to restore the first instance of the tenant object and the first plurality of the database artifacts from a backup; and
in response to the request, restore the first instance of the tenant object and the first plurality of the database artifacts from the backup,
wherein the second instance of the tenant object and the second plurality of the database artifacts are not restored from the backup.

20. A medium according to claim 15, the program code further executable by one or more processing units to cause the computing system to:
receive a request to associate first resource consumption limits with the first instance of the tenant object and to associate second resource consumption limits with the second instance of the tenant object; and
in response to the request, associate first resource consumption limits with the first instance of the tenant object and second resource consumption limits with the second instance of the tenant,
wherein the first resource consumption limits are different from the second resource consumption limits.

* * * * *